US006585621B2

(12) United States Patent
Matthews et al.

(10) Patent No.: US 6,585,621 B2
(45) Date of Patent: Jul. 1, 2003

(54) METHOD AND APPARATUS FOR PROVIDING A CONSISTENT TRANSMISSION LOAD VARIABLE

(75) Inventors: Gregory Paul Matthews, West Bloomfield, MI (US); Charles Henry Folkerts, Troy, MI (US); Jeffrey James Allen, Brighton, MI (US)

(73) Assignee: General Motors Corporation, Detroit, MI (US)

( * ) Notice: Subject to any disclaimer, the term of this patent is extended or adjusted under 35 U.S.C. 154(b) by 13 days.

(21) Appl. No.: 09/847,080

(22) Filed: May 3, 2001

(65) Prior Publication Data
US 2003/0027687 A1 Feb. 6, 2003

(51) Int. Cl.[7] .......................... F16H 59/24; F02D 17/02; B60K 41/04
(52) U.S. Cl. ........................ 477/115; 477/21; 123/198 F
(58) Field of Search ................................. 477/121, 902, 477/115; 123/399, 198 F

(56) References Cited

U.S. PATENT DOCUMENTS

| 4,061,055 A | * | 12/1977 | Iizuka et al. ............. 123/198 F |
| 5,205,261 A | * | 4/1993 | Betts, Jr. et al. ............. 123/494 |
| 5,267,541 A | * | 12/1993 | Taguchi et al. .......... 123/198 F |
| 5,431,139 A | * | 7/1995 | Grutter et al. ........... 123/198 F |

\* cited by examiner

Primary Examiner—Ankur Parekh
(74) Attorney, Agent, or Firm—Christopher DeVries

(57) ABSTRACT

A vehicle control system includes a variable displacement internal combustion engine, a transmission coupled to the variable displacement internal combustion engine, an intake manifold coupled to the variable displacement internal combustion engine, a throttle coupled to the intake manifold, an engine controller for controlling the throttle and the variable displacement internal combustion engine, and a transmission controller for controlling the transmission. The engine controller transfers a throttle position or load value to the transmission controller. This throttle position or load value is independent of the actual displacement of the variable displacement internal combustion engine.

18 Claims, 2 Drawing Sheets

METHOD AND APPARATUS FOR PROVIDING A CONSISTENT TRANSMISSION LOAD VARIABLE

TECHNICAL FIELD

The present invention relates to the control of internal combustion engines. More specifically, the present invention relates to a method and apparatus to provide a variable indicative of torque in a variable displacement internal combustion engine for an automatic transmission control system.

BACKGROUND OF THE INVENTION

Present regulatory conditions in the automotive market have led to an increasing demand to improve fuel economy and reduce emissions in present vehicles. These regulatory conditions must be balanced with the demands of a consumer for high performance and quick response for a vehicle. Variable displacement internal combustion engines (ICEs) provide for improved fuel economy and torque on demand by operating on the principal of cylinder deactivation. During operating conditions that require high output torque, every cylinder of a variable displacement ICE is supplied with fuel and air (also spark, in the case of a gasoline ICE) to provide torque for the ICE. During operating conditions at low speed, low load and/or other inefficient conditions for a fully-displaced ICE, cylinders may be deactivated to improve fuel economy for the variable displacement ICE and vehicle. For example, in the operation of a vehicle equipped with an eight cylinder variable displacement ICE, fuel economy will be improved if the ICE is operated with only four cylinders during low torque operating conditions by reducing throttling losses. Throttling losses, also known as pumping losses, are the extra work that an ICE must perform to pump air around the restriction of the throttle and from the relatively low pressure of the intake manifold through the engine and out to the atmosphere.

The cylinders that are deactivated will not allow air flow through their intake and exhaust valves, reducing pumping losses by forcing the ICE to operate at a higher intake manifold pressure. Since the deactivated cylinders do not allow air to flow, additional losses are avoided by operating the cylinders as "air springs" due to the compression and decompression of the air in each deactivated cylinder.

For vehicles equipped with an automatic transmission, the deactivation of cylinders for a variable displacement ICE and the corresponding changes in air flow and torque must be coordinated with the operation of the automatic transmission. Traditionally, an automatic transmission control system will receive a throttle area or a throttle position variable that is indicative of the torque output of an ICE. The throttle position or area is used by a transmission control system as an indication of how much torque the ICE produces and is used in gear selection and stabilization of transmission shifts. In a variable displacement ICE, the throttle position will change when the variable displacement ICE is in partial and full displacement to produce the same torque. Thus, with variable displacement ICEs, throttle position/area no longer represents a unique engine torque value, making throttle position/area alone an insufficient load or torque variable.

SUMMARY OF THE INVENTION

The present invention is a method and apparatus that produces a throttle load variable for a variable displacement ICE that is independent of the displacement of the ICE. In the preferred embodiment of the present invention, an eight-cylinder internal combustion engine (ICE) may be operated as a four-cylinder engine by deactivating four cylinders. The cylinder deactivation occurs as a function of load or torque demand by the driver. An engine or powertrain controller will determine if the ICE should enter four-cylinder mode by monitoring the load and torque demands of the ICE. If the ICE is in a condition where it is inefficient to operate with the full complement of eight cylinders, the controller will deactivate the mechanisms operating the valves for the selected cylinders and also shut off fuel (and possibly spark in the case of a gasoline engine) to the cylinders. The deactivated cylinders will thus function as air springs to reduce throttling or pumping losses.

As previously described, the transition from eight cylinders to four cylinders or four cylinders to eight cylinders will create changes in the air flow through the throttle plate into the ICE that also affect the torque output of the ICE. The present invention generates a throttle plate position/area signal for an automatic transmission or powertrain controller that represents the torque output of the ICE independent of the displacement of the engine. The present invention includes software having a plurality of function blocks that calculate the desired throttle position/area for varying displacements of the ICE. These function blocks will simultaneously operate and generate the throttle area/position variable, and the engine or powertrain controller will determine the correct throttle area/position command to be used, depending on the displacement of the ICE. Accordingly, a throttle position/area command will always be calculated for a fully-displaced engine and may be used as a load variable for a transmission or powertrain controller.

DESCRIPTION OF THE PREFERRED EMBODIMENT

Figure 1:
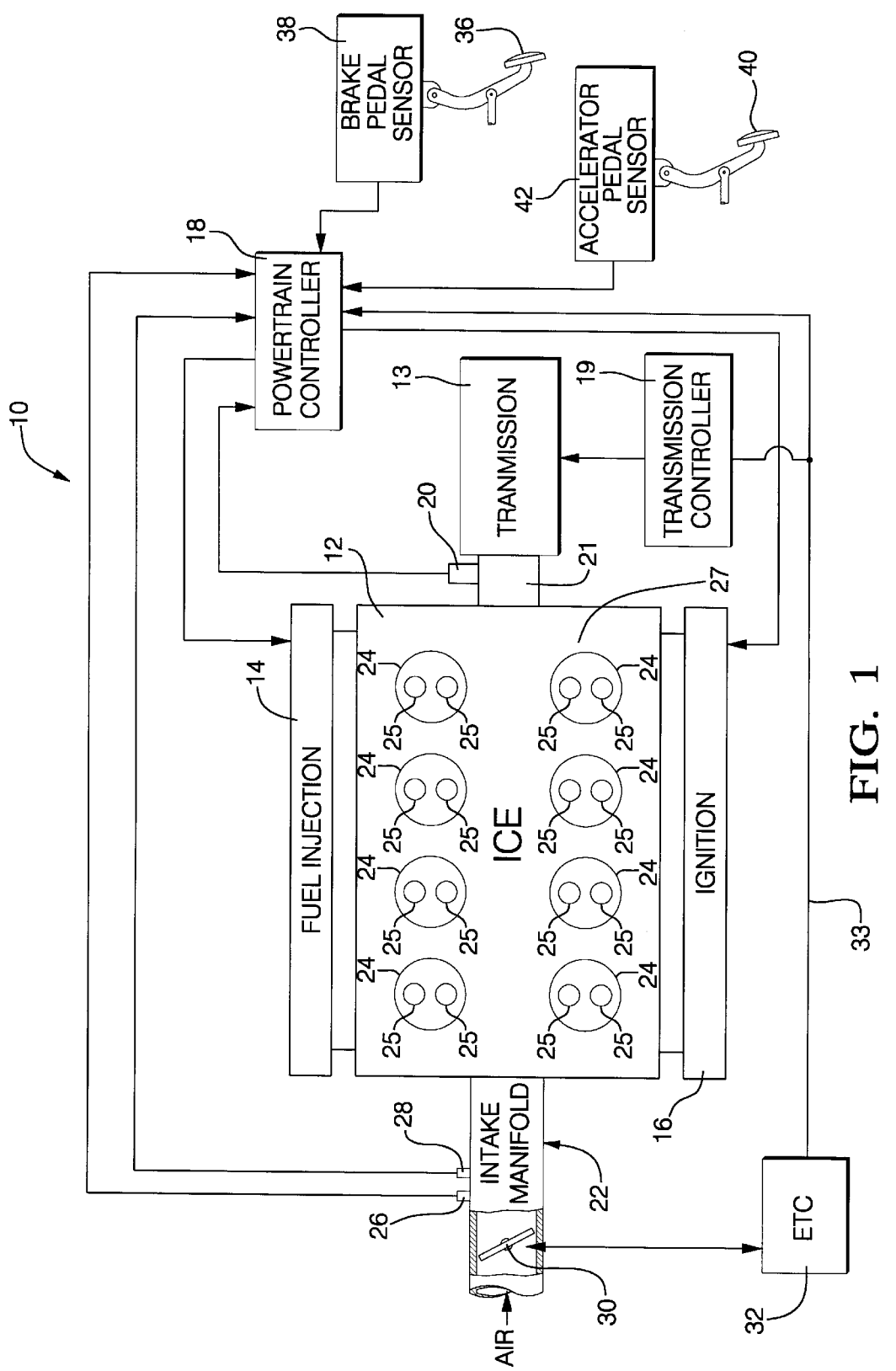
FIG. 1 is a diagrammatic drawing of the control system of the present invention.

FIG. 1 is a diagrammatic drawing of the vehicle control system 10 of the present invention. The control system 10 includes a variable displacement ICE 12 having fuel injectors 14 and spark plugs 16 controlled by an engine or powertrain controller 18. The ICE 12 is further coupled to an automatic transmission 13 as is known in the art. The ICE 12 crankshaft 21 speed and position are detected by a speed and position detector 20 that generates a signal such as a pulse train to the engine controller 18. An intake manifold 22 provides air to the cylinders 24 of the ICE 12. The cylinders 24 include valves 25 that may be mechanically decoupled by a deactivation apparatus to prevent air flow through each individual cylinder 24. An air flow sensor 26 and manifold air pressure (MAP) sensor 28 detect the air flow and air pressure within the intake manifold 22 and generate signals to the powertrain controller 18. The airflow sensor 26 is preferably a hot wire anemometer and the MAP sensor 28 is preferably a strain gauge.

An electronic throttle (ETC) 30 having a throttle plate controlled by an electronic throttle controller 32 controls the amount of air entering the intake manifold 22. The electronic throttle 30 may utilize any known electric motor or actuation technology in the art including, but not limited to, DC motors, AC motors, permanent magnet brushless motors, and reluctance motors. The electronic throttle controller 32 includes power circuitry to modulate the electronic throttle 30 and circuitry to receive position and speed input from the electronic throttle 30. In the preferred embodiment of the present invention, an absolute rotary encoder is coupled to the electronic throttle 30 to provide speed and position information to the electronic throttle controller 32. In alternate embodiments of the present invention, a potentiometer may be used to provide speed and position information for the electronic throttle 30. The electronic throttle controller 32 further includes communication circuitry such as a serial link or automotive communication network interface to communicate with the powertrain controller 18 and a transmission controller 19 over an automotive communication network 33. The powertrain controller 18 will transmit a throttle position/area variable to the transmission controller 19 indicative of torque to control the shifting of the automatic transmission 13. In alternate embodiments, the electronic throttle controller 32 and transmission controller 19 may be fully integrated into the powertrain controller 18 to eliminate the need for physically separate controllers.

A brake pedal 36 in the vehicle is equipped with a brake pedal sensor 38 to determine the amount of pressure generated by an operator of the vehicle on the brake pedal 36. The brake pedal sensor 38 generates a signal to the powertrain controller 18 to determine a braking condition for the vehicle. A braking condition will indicate a low torque/low demand condition for the variable displacement ICE 12. An accelerator pedal 40 in the vehicle is equipped with a pedal position sensor 42 to sense the position of the accelerator pedal. The pedal position sensor 42 signal is also communicated to the powertrain controller 18. In the preferred embodiment of the present invention, the brake pedal sensor 38 is a strain gauge and the pedal position sensor 42 is an absolute rotary encoder.

Figure 2:
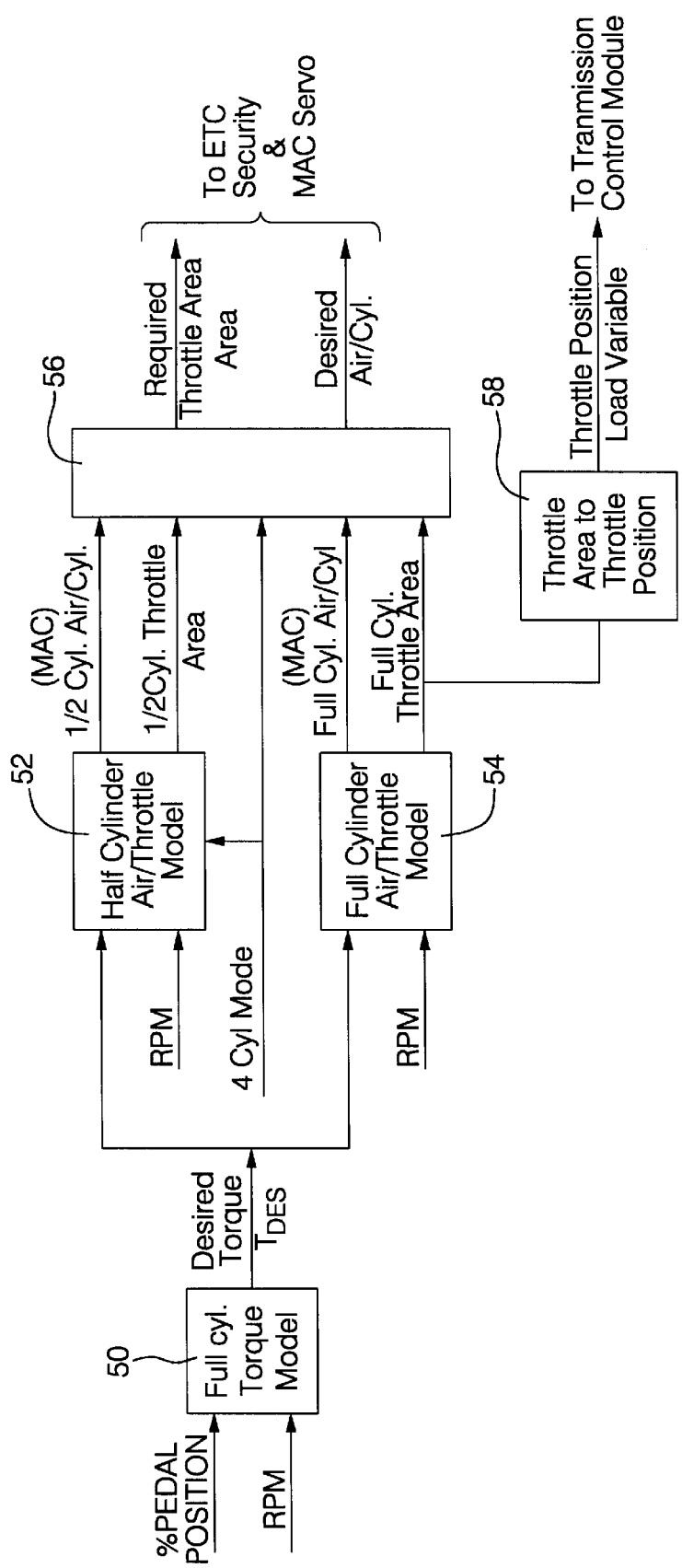
FIG. 2 is a process control diagram for the control system of the present invention.

FIG. 2 is a process control diagram for the control system 10 of the present invention. The control system 10 of the present invention is based on simultaneously calculating a desired throttle position/area for preferably a full displacement for an eight-cylinder, variable displacement engine and a four-cylinder displacement for an eight-cylinder, variable displacement engine.

Referring to FIG. 2, at block 50 of the process diagram, a reference torque model based on the full ICE 12 displacement is used to develop a torque map or lookup table which determines the amount of torque that the driver is requesting ($T_{DES}$) based on the ICE 12 crankshaft 21 rotations per minute (RPMs) and accelerator pedal 40 position. The powertrain controller 18 determines the accelerator pedal 40 position from the signal generated by the pedal position sensor 42. The powertrain controller 18 further determines the RPMs of the ICE 12 crankshaft 21 from the pulse train generated from crankshaft speed sensor 20.

At block 52, the powertrain controller 18 computes desired mass air flow or the mass-air/cylinder (MAC) needed to produce the desired torque in the ICE 12 with only half (preferably four for an eight-cylinder ICE) of the cylinders 24 activated. The term activated for a cylinder 24 will be characterized as supplying a cylinder 24 with air and any permutation of fuel and spark. The MAC at block 52 is preferably determined by using the $T_{DES}$ and the ICE 12 crankshaft RPM in conjunction with a mathematical model or a lookup table stored in the powertrain controller 18 memory. At block 52, the powertrain controller 18 further computes the nominal electronic throttle 30 position/area needed to produce the $T_{DES}$ based on the ICE 12 with only half (preferably four for an eight-cylinder ICE) of the cylinders 24 activated. Nominal throttle position is the throttle position the engine requires (at a given ICE crankshaft RPM) to produce an engine torque of $T_{DES}$. The nominal electronic throttle 30 position is preferably determined by using the $T_{DES}$ and the crankshaft RPM feedback in conjunction with a mathematical model or a lookup table stored in the powertrain controller 18 memory.

At block 54, the powertrain controller 18 computes the MAC needed to produce the desired torque in the ICE 12 with all of the cylinders 24 activated. The MAC at block 54 is preferably determined by using the $T_{DES}$ and the crankshaft RPM in conjunction with a mathematical model or a lookup table stored in the powertrain controller 18 memory.

At block 54, the powertrain controller 18 further computes the nominal electronic throttle 30 position/area needed to produce the $T_{DES}$ based on the ICE 12 with all (preferably eight for an eight-cylinder ICE) of the cylinders 24 activated. The nominal electronic throttle 30 position is preferably determined by using the $T_{DES}$ and the crankshaft RPM feedback in conjunction with a mathematical model or a lookup table stored in the powertrain controller 18 memory.

Block 56 selects which pair of values to use in the control of the ETC, as blocks 52 and 54 will be running simultaneously independent of the displacement of the ICE 12. If half the cylinders are shut off, then the output of block 52 is used, and if all the cylinders are active, then the output of block 54 is used. These outputs are sent to the ETC controller 32 for control of the position of the ETC 30. As previously described, the ETC 30 must be varied to compensate for the displacement of the ICE 12 to generate the same amount of torque in both a partially-displaced and fully-displaced operating mode.

Block 58 produces the engine torque load variable for the transmission controller 19. The output of block 54 is always used, as block 54 produces the throttle area variable for the ICE 12 in a fully-displaced configuration. Block 58 converts the throttle area variable to throttle rotation or a load variable, using the geometry of a particular throttle body, to be communicated to the transmission controller 19. The transmission controller 19 then adjusts the shifts of the automatic transmission 13 with reference to the throttle position load variable. Accordingly, the displacement of the ICE 12 is transparent to the transmission controller 19, as the transmission controller 19 always receives a throttle position command representative of the torque of the ICE 12.

While this invention has been described in terms of some specific embodiments, it will be appreciated that other forms can readily be adapted by one skilled in the art. Accordingly, the scope of this invention is to be considered limited only by the following claims.

What is claimed is:

1. A vehicle control system comprising:
   a variable displacement internal combustion engine;
   a transmission coupled to said variable displacement internal combustion engine;
   an intake manifold coupled to said variable displacement internal combustion engine;
   a throttle coupled to said intake manifold;
   an engine controller for controlling said throttle and said variable displacement internal combustion engine;
   wherein said engine controller transfers a throttle position value to said transmission controller, said throttle position value independent of the actual displacement of said variable displacement internal combustion engine.

2. The engine control system of claim 1 wherein said throttle is an electronic throttle.

3. The engine control system of claim 1 wherein said variable displacement internal combustion engine is a gasoline engine.

4. The engine control system of claim 1 wherein said engine controller and said transmission controller are integrated into a single controller.

5. The engine control system of claim 1 wherein said variable displacement internal combustion engine is an eight-cylinder engine.

6. The engine control system of claim 1 further including an airflow sensor to detect airflow through said intake manifold.

7. The engine control system of claim 1 wherein said throttle position value is generated by a throttle model based on a desired engine torque and engine speed.

8. A method of providing throttle position in a variable displacement internal combustion engine to at least one control system:
   providing an electronic control module;
   providing an electronic throttle;
   providing a partial cylinder throttle model in said electronic control module;
   providing a full cylinder throttle model in said electronic control module;
   varying the displacement of the engine; and
   transferring a throttle position generated by said full cylinder throttle model in partial displacement and full displacement to the at least one control system.

9. The method of claim 8 further wherein said throttle position corresponds to throttle area.

10. The method of claim 8 further comprising the step of generating said throttle position continuously during operation of said variable displacement internal combustion engine.

11. A method of providing a throttle position load variable for a transmission control system comprising:
    providing a variable displacement internal combustion engine;
    providing an electronic control module;
    providing an electronic throttle to control air flow in said internal combustion engine;
    providing a partial cylinder throttle model in said electronic control module;
    providing a full cylinder throttle model in said electronic control module;
    providing a transmission control system in said electronic control module;
    varying the displacement of said variable displacement internal combustion engine; and
    generating a throttle position variable using said full cylinder throttle model, when said variable displacement internal combustion engine is in partial displacement and full displacement, for use by said transmission control system.

12. The method of claim 11 further comprising the step of generating said throttle position variable continuously during operation of said variable displacement internal combustion engine.

13. The method of claim 11 further comprising the step of providing a mass-air per cylinder control software in said electronic control module to adjust said electronic throttle.

14. A vehicle control system comprising;
    a variable displacement internal combustion engine;
    a transmission coupled to said variable displacement internal combustion engine;
    an intake manifold coupled to said variable displacement internal combustion engine;
    a throttle coupled to said intake manifold;
    an engine controller for controlling said throttle and said variable displacement internal combustion engine;
    a transmission controller for controlling said transmission; and
    wherein said engine controller transfers a throttle position in digital form to a transmission control system.

15. The vehicle control system of claim 14 wherein said engine controller continuously transfers said throttle position to said transmission control system, said throttle position value independent of the actual displacement of said variable displacement internal combustion engine.

16. The vehicle control system of claim 14 wherein said throttle position value is sent via an automotive communication network to said transmission control system.

17. A method of providing throttle position in a variable displacement internal combustion engine to at least one control system comprising:
    providing an electronic control module;
    providing an electronic throttle;
    providing a partial cylinder throttle model in said electronic control module;
    providing a full cylinder throttle model in said electronic control module;
    varying the displacement of the engine; and
    transferring in digital form a throttle position generated by said full cylinder throttle model when the engine is operating in partial displacement or full displacement to the at least one control system.

18. The method of claim 17 wherein transferring in digital form a throttle position generated by said full cylinder throttle model comprises transferring the throttle position over an automotive communication network.

* * * * *